(12) United States Patent
Thompson et al.

(10) Patent No.: US 8,106,791 B2
(45) Date of Patent: *Jan. 31, 2012

(54) SYSTEM AND METHOD FOR RECEIVING AND DECODING ELECTROMAGNETIC TRANSMISSIONS WITHIN A WELL

(75) Inventors: M. Clark Thompson, Los Alamos, NM (US); Don M. Coates, Santa Fe, NM (US); David W. Beck, Santa Fe, NM (US)

(73) Assignee: Chevron U.S.A. Inc., San Ramon, CA (US)

(*) Notice: Subject to any disclaimer, the term of this patent is extended or adjusted under 35 U.S.C. 154(b) by 1327 days.

This patent is subject to a terminal disclaimer.

(21) Appl. No.: 11/785,040

(22) Filed: Apr. 13, 2007

(65) Prior Publication Data

US 2008/0253230 A1    Oct. 16, 2008

(51) Int. Cl.
*G01V 3/26* (2006.01)
*G01V 3/30* (2006.01)

(52) U.S. Cl. .................. 340/854.3; 340/854.6
(58) Field of Classification Search ............... 340/854.3, 340/854.6
See application file for complete search history.

(56) References Cited

U.S. PATENT DOCUMENTS

| | | |
|---|---|---|
| 3,320,579 A | 5/1967 | Abbott |
| 3,562,741 A | 2/1971 | McEvoy et al. |
| 4,023,136 A | 5/1977 | Lamensdorf et al. |
| 4,160,970 A | 7/1979 | Nicolson |
| 4,218,507 A | 8/1980 | Deffeyes et al. |
| 4,308,499 A | 12/1981 | Thierbach et al. |
| 4,430,577 A | 2/1984 | Bouquet |
| 4,839,644 A | 6/1989 | Safinya et al. |
| 4,845,378 A | 7/1989 | Garbe et al. |
| 5,150,067 A | 9/1992 | McMillan |
| 5,355,714 A | 10/1994 | Suzuki et al. |
| 5,423,222 A | 6/1995 | Rudd et al. |
| 5,451,873 A | 9/1995 | Freedman et al. |
| 5,467,083 A | 11/1995 | McDonald et al. |
| 5,576,703 A | 11/1996 | MacLeod et al. |
| 5,587,707 A | 12/1996 | Dickie et al. |
| 5,680,029 A | 10/1997 | Smits et al. |
| 5,686,779 A | 11/1997 | Vig |
| H1744 H | 8/1998 | Clayton et al. |

(Continued)

FOREIGN PATENT DOCUMENTS

EP     0314654     3/1989

(Continued)

OTHER PUBLICATIONS

Eurasian Office Action relating to Eurasian Application No. 200970945 filed on Apr. 11, 2008 (translation provided), 4 pages.

(Continued)

*Primary Examiner* — Giovanna Wright
(74) *Attorney, Agent, or Firm* — Merchant & Gould

(57) ABSTRACT

Exemplary systems and methods are directed to transmission of electromagnetic (EM) pulses in a downhole environment, which is located below a surface of a landform. A sequence of EM energy pulses is generated from a signal generator located at the surface of the landform. The energy pulses are reflected at a ring frequency by one or more downhole transducers. The reflected energy pulse is received at a receiver, which is located at the surface, during a predetermined time interval. The receiver detects the received energy pulses through a time domain or frequency domain technique. The detected ring frequency is correlated to a parameter or condition of the downhole environment.

31 Claims, 12 Drawing Sheets

U.S. PATENT DOCUMENTS

| | | | |
|---|---|---|---|
| 5,821,129 A | 10/1998 | Grimes et al. |
| 5,936,913 A | 8/1999 | Gill et al. |
| 5,942,991 A | 8/1999 | Gaudreau et al. |
| 6,025,725 A | 2/2000 | Gershenfeld et al. |
| 6,234,257 B1 | 5/2001 | Ciglenec et al. |
| 6,393,921 B1 | 5/2002 | Grimes et al. |
| 6,434,372 B1 | 8/2002 | Neagley et al. |
| 6,633,236 B2 | 10/2003 | Vinegar et al. |
| 6,670,880 B1 | 12/2003 | Hall et al. |
| 6,766,141 B1 | 7/2004 | Briles et al. |
| 6,993,432 B2 | 1/2006 | Jenkins et al. |
| 7,017,662 B2 | 3/2006 | Schultz et al. |
| 7,114,561 B2 | 10/2006 | Vinegar et al. |
| 7,158,049 B2 | 1/2007 | Hoefel et al. |
| 7,168,487 B2 | 1/2007 | Salamitou et al. |
| 7,180,826 B2 | 2/2007 | Kusko et al. |
| 7,256,707 B2 | 8/2007 | Clark et al. |
| 7,397,388 B2 | 7/2008 | Huang et al. |
| 7,530,737 B2 | 5/2009 | Thompson et al. |
| 7,548,068 B2 | 6/2009 | Rawle et al. |
| 2007/0030762 A1 | 2/2007 | Huang et al. |
| 2007/0107528 A1 | 5/2007 | Schroeder et al. |
| 2007/0206440 A1 | 9/2007 | Fripp et al. |
| 2008/0185328 A1 | 8/2008 | Stefanini |
| 2008/0264624 A1 | 10/2008 | Hall et al. |
| 2009/0031796 A1 | 2/2009 | Thompson et al. |
| 2009/0226263 A1 | 9/2009 | Wetch |

FOREIGN PATENT DOCUMENTS

| | | |
|---|---|---|
| GB | 2 386 691 A | 9/2003 |
| GB | 2 425 593 A | 11/2006 |

OTHER PUBLICATIONS

Goswami et al., "On Subsurface Wireless Data Acquisition System," IEEE Trans. On Geosci. And Rem Sensing, vol. 43(10), pp. 2332-2339 (2005).

International Search Report from PCT/US2008/04730, mailed Jul. 1, 2008.

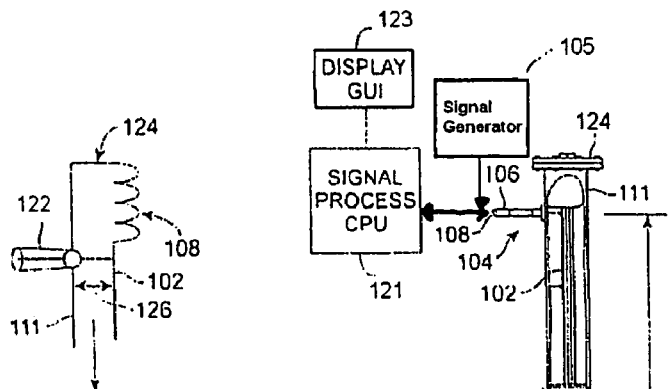
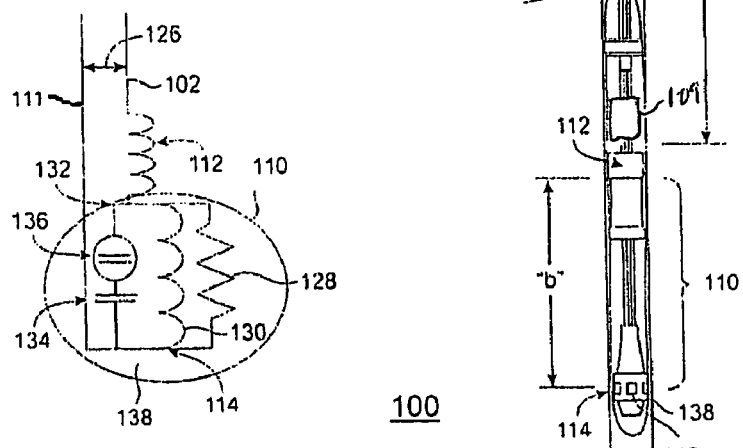
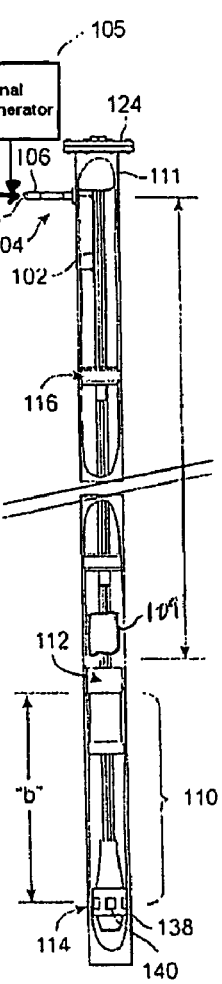
FIG. 1B
FIG. 1C
FIG. 1A

SYSTEM AND METHOD FOR RECEIVING AND DECODING ELECTROMAGNETIC TRANSMISSIONS WITHIN A WELL

BACKGROUND

1. Field

Methods and systems are disclosed for receiving and decoding electromagnetic-based information and its communication within a well.

2. Background Information

U.S. Pat. No. 6,766,141 (Briles et al.) discloses a system for remote downhole well telemetry. Telemetry communication is used for monitoring oil well conditions and recording instruments which are located in a vicinity of a bottom of a gas or oil recovery pipe.

As described in U.S. Pat. No. 6,766,141, known telemetry systems include a radio frequency (RF) generator/receiver base station that communicates electrically with conductive piping located in a borehole. The RF frequency is characterized as being electromagnetic radiation between 3 Hz and 30 GHz. A downhole electronics module having a reflecting antenna receives a radiated carrier signal from the RF generator/receiver. The radiated carrier signal is then modulated and reflected, the modulation being responsive to downhole measurements performed by the electronics module. The reflected, modulated signal is transmitted by the pipe to the surface of the well where it can be detected by the RF generator/receiver. The detected signal is analyzed to determine drilling conditions within the borehole.

Notwithstanding the benefits of such an above-described system, signal strength limitations inherent to the technique can limit the technique's overall applicability. Accordingly, an improved technique could provide improved signal strength—particularly wherein an electromagnetic (EM) pulse is used in place of standard RF signals.

SUMMARY

In view of the aforementioned limitations of the prior art, the present invention provides improved signal strength, by utilizing an electromagnetic (EM) pulse (provided by an EM pulse generator), to effectively communicate with and wirelessly interrogate sensors and other devices located in a downhole environment. Such improvement is enhanced by an exploitation of the time delay between the initial pulse (from the surface) and the time at which the reflected signal is received back at the surface. Such improvement is further possible by using inductive ferrite rings to isolate the production tubing of a wellbore from the wellbore casing.

In some embodiments, the present invention is directed to methods for interrogating a downhole environment located below a surface of a landform based on at least one electromagnetic energy pulse (i.e., an EM pulse) that is reflected at a ring frequency from one or more downhole transducers (sensors). The methods include directing at least one electromagnetic energy pulse into a downhole environment such that the electromagnetic energy pulse interacts with at least one downhole transducer such that at least some of the electromagnetic energy contained within the pulse is reflected at a ring frequency determined by the at least one downhole transducer. The methods also include receiving the reflected energy pulse at a receiver located at the surface of the landform during a predetermined time interval wherein the predetermined time interval is synchronized based on a depth determined delay of the reflected pulse. The methods include processing the reflected energy pulse to extract the ring frequency and correlating the ring frequency to a parameter of the downhole environment.

In accordance with alternate embodiments, an exemplary method for interrogating a downhole environment located below a surface of a landform is based on at least one electromagnetic energy pulse that is reflected from one or more downhole transducers at a frequency determined by downhole characteristics, including receiving the at least one reflected energy pulse at a receiver, which is located at the surface of the landform, during a predetermined time interval. Exemplary steps of the method also include locking onto the ring frequency of the reflected energy pulse, and correlating the locked frequency to a parameter of the downhole environment.

Additionally, an exemplary system for interrogating a downhole environment, which is located below a surface of a landform, is based on at least one energy pulse that is reflected from a downhole transducer to a location at the surface of the landform, including means for receiving the modulated energy pulse at the surface during a predetermined time interval. The system also includes means for processing the received energy pulse to extract the modulation frequency, and means for correlating the modulation frequency of the energy pulse to a parameter of the transducer or a characteristic of the downhole environment.

In other embodiments, the present invention provides for an exemplary apparatus for interrogating a downhole environment located below a surface of a landform, the apparatus typically being included in a system that transmits energy pulses to a downhole transducer which modulates the energy pulses and returns the modulated energy pulses to the surface of the landform. The apparatus includes means for receiving the modulated energy pulses at the surface. In some embodiments, the apparatus further includes means for sampling the modulated energy pulses and means for determining the modulating frequency of the sampled energy pulses. Moreover, the apparatus includes means for correlating the modulating frequency to conditions of the downhole environment.

In some or other embodiments, the apparatus further includes means for receiving the modulated energy pulses at the surface. The apparatus further includes means for locking onto the modulating frequency of the energy pulses when the modulating frequency is within a tolerance range, and means for correlating the modulating frequency to conditions of the downhole environment.

The foregoing has outlined rather broadly the features of the present invention in order that the detailed description of the invention that follows may be better understood. Additional features and advantages of the invention will be described hereinafter which form the subject of the claims of the invention.

DESCRIPTION OF THE DRAWINGS

Other advantages and features described herein will be more readily apparent to those skilled in the art when reading the following detailed description in connection with the accompanying drawings, wherein:

FIGS. 1A-1D show an exemplary embodiment of an apparatus for sensing a characteristic of a borehole;

DETAILED DESCRIPTION

Figure 1D:
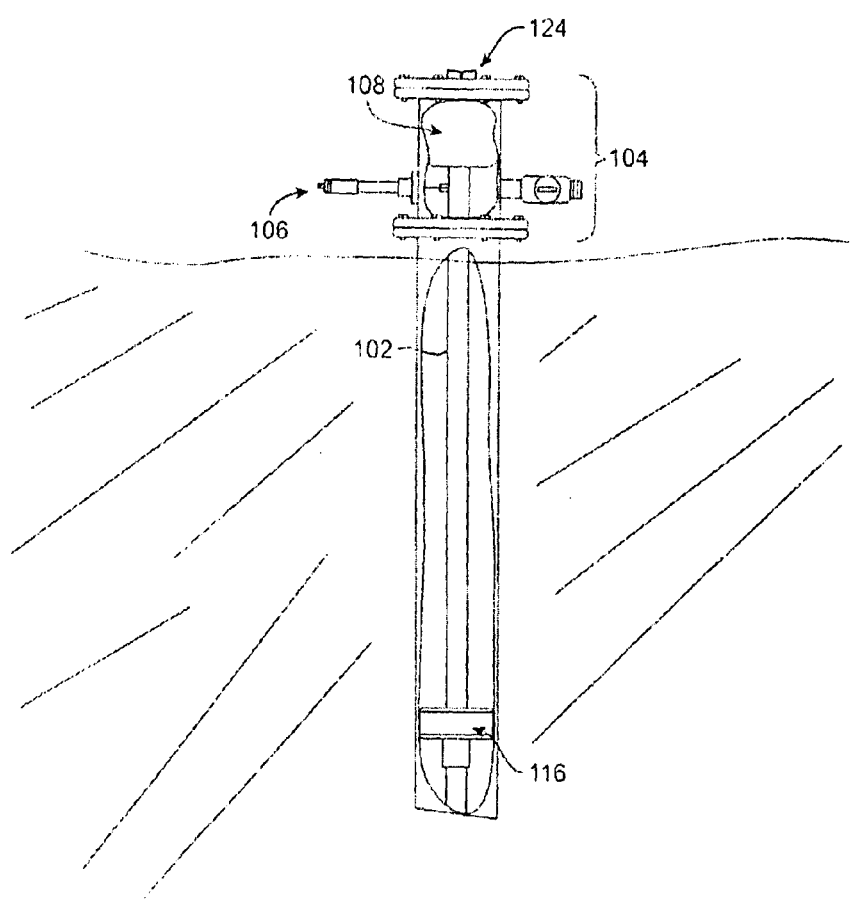

As mentioned above, the present invention utilizes an electromagnetic (EM) pulse to wirelessly interrogate one or more transducers (sensors) in a downhole environment. An EM pulse is a broadband, high-duration burst of electromagnetic energy. See FED-STD-1037C, "Telecommunications: Glossary of Telecommunication Terms," GSA, Aug. 7, 1996. Such EM pulses differ markedly from the radiofrequency (RF) signals used in Briles et al., U.S. Pat. No. 6,766,141.

FIG. 1 shows an exemplary apparatus 100 for interrogating a downhole environment, in accordance with tsome embodiments of the present invention. Apparatus 100 is more fully described below.

As referenced herein, a downhole environment can be an area within or below the surface of a landform that includes a borehole and the area surrounding a borehole through which electromagnetic energy can be communicated. The borehole can be a cavity that can be located within or beneath a landform, and which can be characterized by various orientations, material compositions, temperature, pressure, flow rate, or other measurable parameter(s)—all of which can vary along its length. The electromagnetic energy can be processed to measure desired characteristics of the downhole environment. The apparatus 100 mentioned above includes means, such as a conductive pipe 102, for conducting a pulse through the borehole to interrogate the borehole and/or downhole environment. As referenced herein, interrogating can include transmitting electromagnetic energy (as an EM pulse) into a borehole, receiving a reflected energy pulse from electronic components in the borehole, and processing the reflected energy pulse to extract information related to characteristics of the borehole and/or downhole environment.

Referring to exemplary apparatus 100 in FIG. 1, an inlet 104, coupled (e.g., connected) to the conductive pipe 102, is provided for applying electromagnetic energy to the conductive pipe 102. In an exemplary embodiment, the electromagnetic energy can be of any desired frequency selected, for example, as a function of characteristics to be measured within the borehole and as a function of the length and size of the downhole environment.

The inlet 104 includes a probe 106 coupled with the conductive pipe 102. The probe 106 can be formed, for example, as a coaxial connector having a first (e.g., interior) conductor coupled electrically to the conductive pipe 102, and having a second (e.g., exterior) conductive casing coupled to a hollow borehole casing 111. An insulator is used to separate the interior conductor from the exterior conductive casing.

The inlet 104 can include an inductive isolator, such as a ferrite inductor 108 or other inductor or component, for electrically isolating the inlet 104 from a first potential (e.g., a potential, such as a common ground, of the return current path of the borehole casing 111) at a location in a vicinity of the inlet 104. The apparatus 100 can include means, such as a signal generator 105, coupled to the inlet 104 for generating the electromagnetic energy to be applied to the conductive pipe 102.

The hollow borehole casing 111 can be placed into the borehole whose characteristics are to be monitored. The hollow borehole casing 111 can, for example, be configured of steel or other suitable material.

The conductive pipe 102 can be located within, and electrically isolated from, the hollow borehole casing 111 using spacers 116. The spacers 116, for example, can be configured as insulated centralizers which maintain a separation distance of the conductive pipe 102 from the inner walls of the hollow borehole casing 111. These insulating spacers 116 can be configured as disks formed from any suitable material including, but not limited to, nylon.

The apparatus 100 includes means, such as a resonant network device 110 responsive to the pulse, for resonating at a frequency which is modulated as a function of a characteristic of the borehole. The resonant network device 110 can be, for example, any electro-acoustic or other device including, but not limited to, any magnetically-coupled electrically-resonant mechanical structure for performing an electrical resonance, such as the resonant cavity of FIG. 2A, the tank circuit of FIG. 2B, or any other suitable device. The resonant network device can be connected with, or mechanically coupled to, the conductive pipe. A torroidal core of the resonant network device can be magnetically coupled to the conductive pipe. The torroidal core is a magnetic core formed as a medium by which a magnetic field can be contained and/or enhanced. For example, the resonant network device can be a single turn coil with a one inch cross-section wrapped around a ferrite core, or any other suitable device of any suitable shape, size and configuration can be used.

Those skilled in the art will appreciate that a magnetic core is a material significantly affected by a magnetic field in its region, due to the orientable dipoles within its molecular structure. Such a material can confine and/or intensify an applied magnetic field due to its low magnetic reluctance. The wellhead ferrite inductance 108 can provide a compact inductive impedance in a range of, for example, 90-110 ohms, or lesser or greater as desired, relative between an inlet feed point on the pipe and a wellhead flange short. This impedance, in parallel with an exemplary 47 ohm characteristic impedance of the pipe-casing transmission line can reduce the transmitted and received signals by, for example, about ~3 dbV at the inlet feed point for a typical band center at 50 MHz. The magnetic permeability of the ferrite cores can range from ~20 to slightly over 100, or lesser or greater. As such, for a given inductance of an air-core inductor, when the core material is inserted, the natural inductance can be multiplied by about these same factors. Selected core materials can be used for the frequency range of, for example, 10-100 MHz, or lesser or greater.

The resonant network device 110 illustrated in FIG. 1 will be described as the resonant cavity, in the context of FIG. 2A. However, the tank core of FIG. 2B can be readily substituted, as can any other suitable resonant network device known to those skilled in the art. Referring to FIG. 1, the resonant cavity is electrically connected to the conductive pipe, and is located within the hollow borehole casing 111. A length "b" of the resonant cavity within the hollow borehole casing is defined by an inductive isolator formed, for example, as a torroidal core 112 at a first end of the resonant cavity, and by a connection 114 at a first potential (e.g., common ground) at a second end of the resonant cavity. The resonant network device 110 receives energy from the pulse, and "rings" at its natural frequency.

A means for sensing can include a transducer provided in operative communication with the resonant network device 110, and coupled (e.g., capacitively or magnetically) with the first (e.g., common ground) potential. The transducer is configured to sense a characteristic associated with the borehole, and to modulate the frequency induced in the resonant network device 111 when a pulse is applied to the inlet 104 of the probe 106. The modulated frequency can be processed to provide a measure of the borehole characteristic. That is, the frequency induced by the pulse is modulated by a sensed characteristic of the borehole, and this modulation of the frequency can be processed to provide a measure of the characteristic. Typically, the transducer and the resonant network device are one in the same.

The sensing means can include, or be associated with, means for processing, represented as a processor (e.g., computer 121). The processing means can process an output of the resonant network device as transmitted via the borehole casing 111. The processor 121 can provide a signal representing the characteristic to be measured or monitored. In an exemplary embodiment, for example, the processor 121 can be configured to process the received signal using a time domain or a frequency domain tracking method. As referenced herein, sensing includes receiving a reflected energy pulse from a transducer located in the borehole and processing the reflected energy pulse to extract information related to the characteristics of the borehole or downhole environment.

In an exemplary embodiment, at least a portion of the hollow borehole casing 111 is at the first potential (e.g., common ground). For example, the hollow borehole casing 111 can be at a common ground potential at both a location in a vicinity of the inlet 104, and at a location in a vicinity of the resonant network device 110. The grounding of the hollow borehole casing 111 in a vicinity of the inlet 104 is optional and establishes a known impedance for the conductive pipe 102. The grounding of the hollow borehole casing 111 in a vicinity of the resonant network device 110 allows the resonant length to be defined. That is, the resonant cavity has a length within the hollow borehole casing 111 defined by the distance between torroidal coil 112 and the ground connection at a second, lower end of the resonant cavity.

The transducer of the resonant network device 110 can be configured to include passive electrical components, such as inductors and/or capacitors, such that no downhole power is needed. During an assembly of the apparatus 100, as shown in FIG. 1, the conductive pipe can be assembled in sections, and a spacer 116 can be included at each joint between the various pipe sections to ensure that shorting of the casing does not occur. Prior to placing the conductive pipe 102 and the resonant network device 110 into a borehole, a transducer used for sensing the modulated frequency can be calibrated using, e.g, graphical user interface (GUI) 123 and processor 121.

Details of the exemplary apparatus of FIG. 1A will be described further with respect to FIG. 1B, which shows an exemplary telemetry component of the exemplary apparatus of FIG. 1A.

In FIG. 1B, the conductive pipe 102 and hollow borehole casing 111 are electrically isolated from one another via the ferrite inductor 108. Where the resonant network device is a natural resonator, the wavelength of the resonant "ring" frequency can dictate the size (e.g., length) of the device. Those skilled in the art will appreciate that the size constraint can be influenced (e.g., reduced) by "loading" the device with inductance and/or capacitance. For example, the amount of ferrite used in an exemplary embodiment can be selected as a function of desired frequency and size considerations.

An instrumentation signal port 122 is provided for receiving the probe 106. A wellhead configuration, as depicted in FIG. 1B, is normally short-circuited to the hollow borehole casing 111. However, the ferrite inductor 108 alleviates this short circuit and thus isolates the conductive probe of the inlet 104, which is coupled with the conductive pipe 102, from the top of the wellhead which, in an exemplary embodiment, is at the common ground potential. In an exemplary embodiment, because the wellhead is grounded via short-circuiting of the wellhead flange 124 to common ground, the ferrite inductor 108 isolates the short-circuited wellhead flange from the conductive pipe 102 used to convey a pulse from the probe to the resonant cavity.

An exemplary impedance 126 between the conductive pipe 102 and the hollow borehole casing 111, can be on the order of 47 ohms, or lesser or greater. This portion of the conductive pipe 102 serves as a transmission line for communication of the downhole electronics, such as the transducer, with the surface electronics, such as the processor 121.

FIG. 1C illustrates an electrical representation of the resonant cavity and transducer included therein. In FIG. 1C, the torroidal core 112 is represented as an inductor section configured of ferrite material for connecting the conductive pipe 102 with the resonant cavity 110. As can be seen in FIG. 1C, for a resonant network device 110 configured as a resonant cavity, an upper portion 132 of the resonant cavity coincides with a lower section of the torroidal core 112 and can be at an impedance which, in an exemplary embodiment, is relatively high as compared to the impedance between conductive pipe 102 and the casing 111. For example, the impedance at the top of the resonant cavity can be on the order of 2000 ohms, or lesser or greater. For magnetic core-based, magnetically-coupled resonant networks, those measures may have little or no relevance.

This relatively large differential impedance at the top of the resonant cavity relative to the conductive pipe 102 above the resonant cavity provides, at least in part, an ability of the cavity to resonate, or "ring," in response to the pulse and thereby provide a high degree of sensitivity in measuring a characteristic of interest. In addition, the ability of the transducer to provide a relatively high degree of sensitivity is aided by placing a lower end of the resonant cavity at the common ground potential.

The FIG. 1C electrical representation of the resonant network device 110, for a coaxial cavity formed by the conductive pipe 102 and the borehole casing 111, includes a representation of the resonant network resistance 128 and the resonant network inductance 130. A lower portion of the cavity defined by the common ground connection 114 is illustrated in FIG. 1C, such that the cavity is defined by the bottom of the torroidal core 112 and the ground connection 114. A capacitance of the sleeve associated with the resonant cavity is represented as a sleeve capacitance 134.

The transducer associated with the resonant cavity for modulating the vibration frequency induced by the pulse, as acted upon by the characteristic to be measured, is represented as a transducer 136.

For a resonant cavity configuration, the bottom of the resonant cavity can include a Packer seal, to connect the conductive pipe to the hollow borehole casing 111. The Packer 138, as illustrated in FIG. 1C and in FIG. 1A, includes exposed conductors 140 which can interface with conductive portions of the resonant cavity and the hollow borehole casing 111 to achieve the common ground connection 114 at a lower end of the resonant cavity.

FIG. 1D illustrates another detail of the well telemetry component included at an upper end of the conductive pipe 102. In FIG. 1D, a connection of the probe 106 to the conductive pipe 102 is illustrated as passing through the hollow borehole casing 111, in the inlet 104. FIG. 1D shows that the probe 106 is isolated from the short-circuited wellhead flange 124 via the ferrite inductor 108.

Figure 2A:
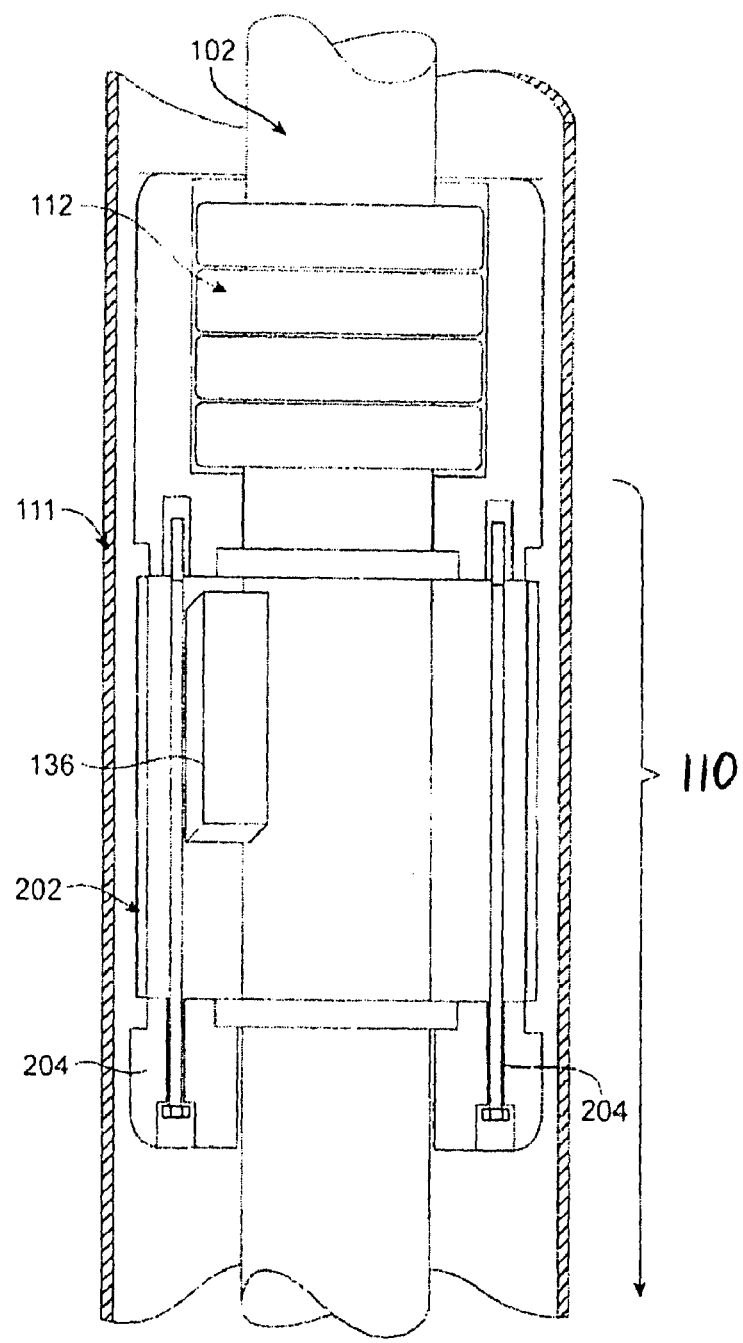
FIG. 2A shows an exemplary resonant cavity for use with the FIG. 1 apparatus.

FIG. 2A shows an exemplary detail of a resonant network device 110 formed as a resonant cavity. In FIG. 2A, the hollow borehole casing 111 can be seen to house the conductive pipe 102. The torroidal core 112 is illustrated, a bottom of which, in the direction going downward into the borehole, constitutes an upper end of the resonant cavity. The transducer 136 is illustrated as being located within a portion of the resonant cavity, and is associated with a conductive sensor sleeve 202, the capacitance of which is represented in FIG. 1C as the sleeve capacitance of the sleeve 134.

The ferrite torroidal core 112 can be configured as a torroidal core slipped into a plastic end piece. Such ferrite materials are readily available, such as cores available from Fair-Rite Incorporated, configured as a low μ, radio frequency-type material, or any other suitable material. Mounting screws 204 are illustrated, and can be used to maintain the sensor sleeve and transducer in place at a location along a length of the conductive pipe 102. A bottom of the resonant cavity, which coincides with a common ground connection of the Packer 138 to the hollow borehole casing, is not shown in FIG. 2.

Figure 2B:
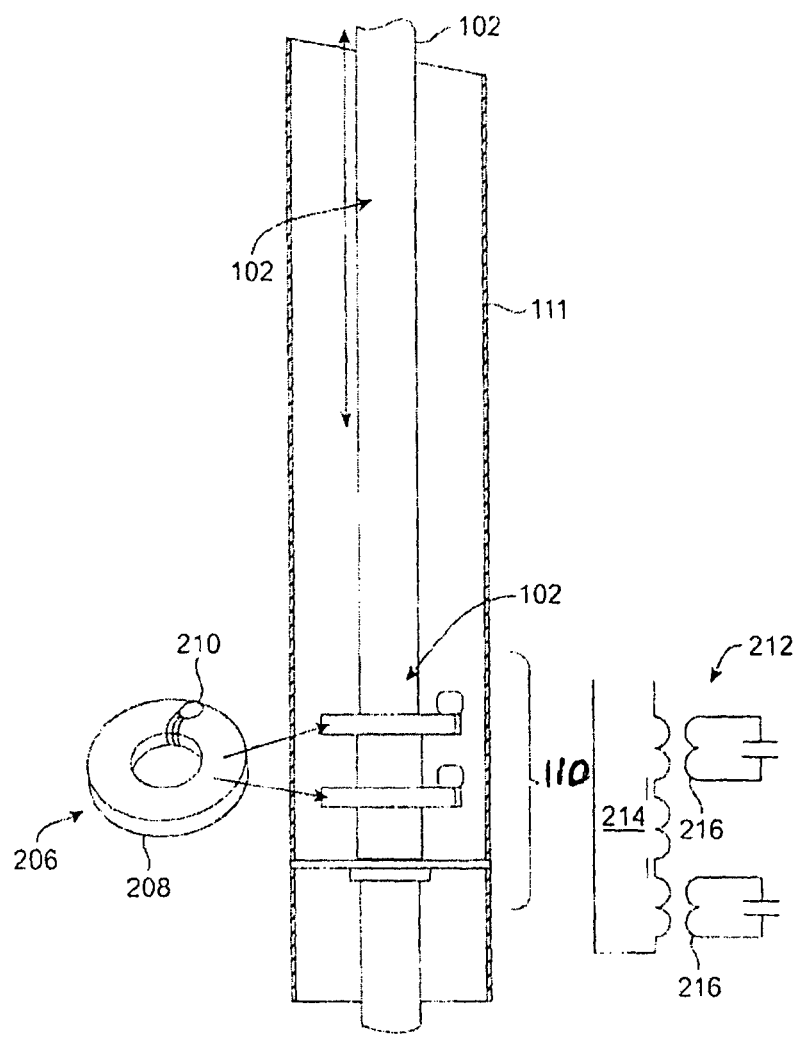
FIG. 2B shows an exemplary resonant network device formed as a magnetically coupled electrically resonant mechanical structure for performing electrical resonance.

FIG. 2B illustrates an exemplary detail of a resonant network formed as a tank circuit. In FIG. 2B, multiple resonant network devices 206 associated with multiple sensor packages can be included at or near the Packer 138 (See FIG. 1). In FIG. 2B, resonators using capacitive sensors and ferrite coupling transformers are provided. Again, the hollow borehole 111 can be seen to house the conductive pipe 102. Each resonant network device 206 is configured as a torroidal core 208 having an associated coil resonator 210. No significant impedance matching, or pipe-casing shorting modifications, to an existing well string need be implemented. The coaxial string structure can carry direct to a short at the Packer 138 using the ferrite torroid resonators as illustrated in FIG. 2B, without a matching section as with the resonant cavity configuration.

In an electrical schematic representation, the conductive pipe 102 can be effectively represented as a single turn winding 214 in the transformer construct, and several secondary windings 216 can be stacked on the single primary current path. The quality of the Packer short is generally of little or no significance. Metal-toothed Packers can alternatively be used. The return signal using this transformer method can be detected, in exemplary embodiments, without using a low Packer shorting impedance.

In the exemplary FIG. 2B embodiment, spacing between multiple resonant network devices 206 can be selected as a function of the desired application. The multiple resonant network devices 206 can be separated sufficiently to mitigate or eliminate mechanical constraints. In addition, separation can be selected to mitigate or eliminate coupling between the devices 206.

In an exemplary embodiment, the distance of one width of a ring can decrease coupling for typical applications. The inductance and/or capacitance of each resonant network device can be modified by adding coil turns, and the number of turns can be selected as a function of the application. For example, the number of turns will set a ring frequency of each resonant network device. Exemplary embodiments can be on the order of 3 to 30 turns, or lesser or greater as desired.

In exemplary embodiments, the frequency used for the multiple resonant network devices 206 can be on the order of 3 MHz to 100 MHz or lesser or greater, as desired. The frequency can be selected as a function of the material characteristics of the conductive pipe 102 (e.g., steel or titanium). Skin depth can limit use of high frequencies above a certain point, and a lower end of the available frequency range can be selected as a function of the simplification of the resonant network device construction. However, if too low a frequency is selected, decoupling from the wellhead connection short should be considered.

Thus, use of ferrite magnetic materials can simplify the downhole resonant network devices mechanically, and can allow fewer alterations to conventional well components. Use of a ferrite magnetic torroid can permit magnetic material to enhance the magnetic field, and thus the inductance, in the current path in very localized compact regions. Thus, stacking of multiple resonant network devices 206 at a remote site down the borehole can be achieved with minimal interaction among the multiple devices. The multiple sensor devices can be included to sense multiple characteristics. The use of a ferrite magnetic torroid can also be used to achieve relatively short isolation distances at the wellhead connection for coupling signal cables to the conductive pipe 102 as shown in FIG. 2C.

Figure 2C:
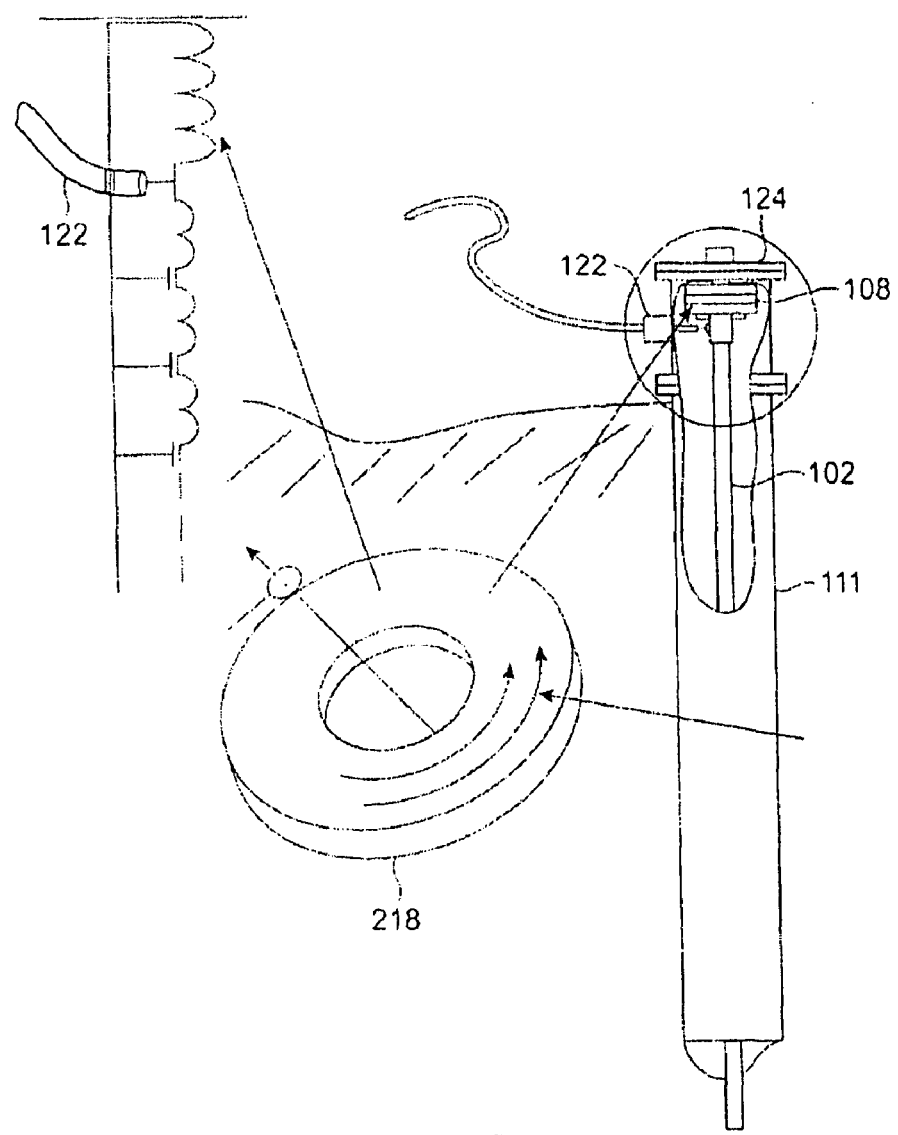
FIG. 2C illustrates an alternate exemplary wellhead connection.

FIG. 2C illustrates an exemplary alternate embodiment of a wellhead connection, wherein a spool 218 is provided in the wellhead flange 124 to accommodate the ferrite isolator and signal connections. An exemplary spool can, for example, be on the order of 8 to 12 inches tall, or any other suitable size to accommodate the specific application. The spool 218 is used for signal connection to the pipe string.

The resonant network device, configured of a "torroidal spool," can be separated and operated substantially independent of sensor packages which are similarly configured and placed in a vicinity of the spool 218. An increased inductance in a width of the torroidal spool can be used to isolate the signal feed point at the wellhead connection. As is represented in FIG. 2C, current on the pipe surface will induce magnetic fields within the ferrite torroid for inductive enhancement of the pipe current path.

Figure 3:
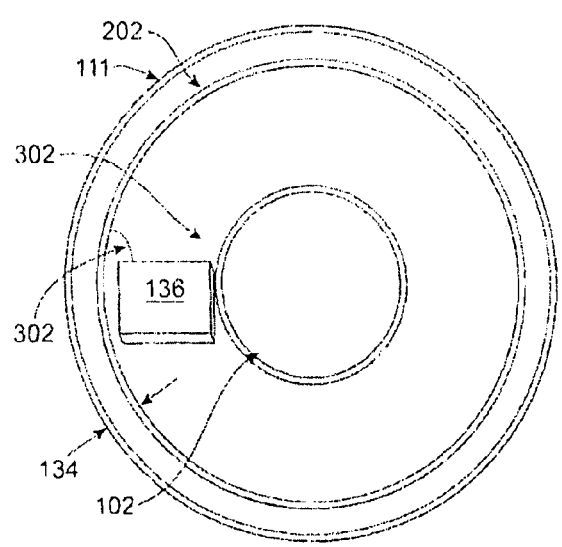
FIG. 3 shows a bottom view of the exemplary FIG. 2A resonant cavity.

FIG. 3 illustrates a view of the FIGS. 2A and 2B devices from a bottom of the borehole looking upward in FIG. 2. In FIG. 3, the transducer 136 can be seen to be connected via, for example, electrical wires 302 to both the sensor sleeve 202 and the conductive pipe 102. The sensor sleeve 202 in turn, is capacitively coupled to the hollow borehole casing 111 via the sleeve capacitance 134.

Figure 4:
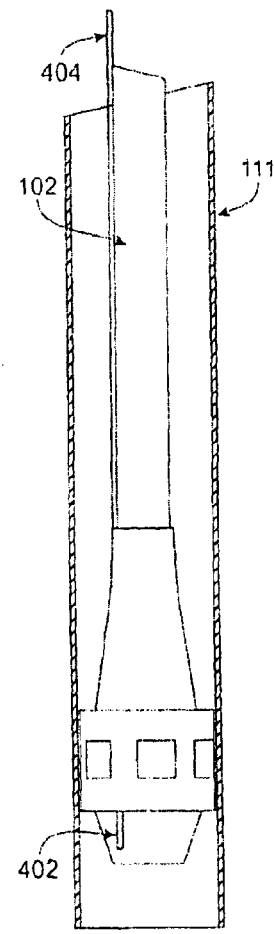
FIG. 4 shows an alternate exemplary embodiment of a resonant cavity, wherein an exemplary mechanical or fluid feed to a transducer is located above a Packer seal.

FIG. 4 illustrates an alternate exemplary embodiment wherein the Packer 138 has been modified to include a conduit extension 402 into a zone of interest, which is deeper in the well than a position of the ferrite ring, where the characteristic of the borehole is to be measured. This extension 402 can, in an exemplary embodiment, be a direct port for sensing, for example, a pressure or temperature using an intermediate fluid to the sensor.

In exemplary embodiments, transducers, such as capacitive transducers, are mounted near the top of the resonant cavity as an electrical element of the sensor sleeve 202.

Remote parameters can be brought to the sensor in the resonant cavity via a conduit that passes through and into a sealed sensing unit. The measurement of a desired parameter can then be remotely monitored. The monitoring can be extended using a mechanical mechanism from the sensor to relocate the sensor within the resonant cavity at different locations along the length of the conductive pipe 102. In FIG. 4, a sensor conduit 404 is provided to a pressure or temperature zone to be monitored.

The exemplary embodiments of apparatus 100, as shown for example in FIGS. 1-4, can be implemented in various downhole environments, e.g., locations below the surface of a landform, which includes, but is not limited to, slope landforms, coastal and oceanic landforms, fluvial landforms, and mountain and glacial landforms. Generally, the sending and receiving circuitry is provided at an above-surface location. In an off-shore or other water environment, the sending and receiving circuitry can be located on a platform or structure above the water surface. Coax cabling or other suitable conduit can be used to send and receive signals between the platform and conductive pipe 102, which is located on the ocean floor. Alternatively, in such off-shore environments, the sending and receiving circuitry can be located on the sea floor.

Figure 5:
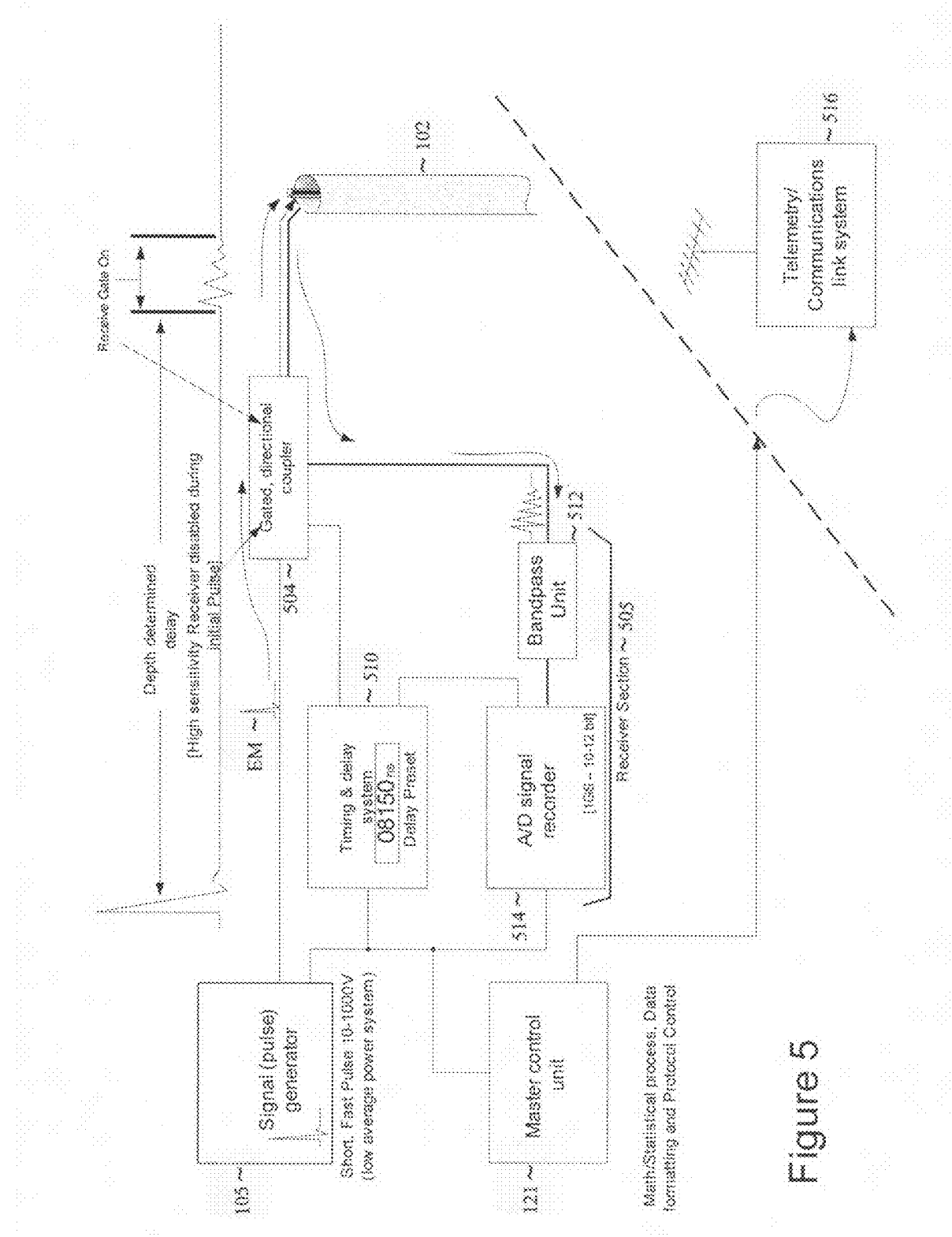
FIG. 5 shows an exemplary system for interrogating a downhole environment through a time domain tracking method.

FIG. 5 illustrates an exemplary system for interrogating a downhole environment through a time domain tracking method.

In FIG. 5, a pulse section representing the signal generator 105 of FIG. 1A is provided to transmit an exemplary impulse 502. This pulse is supplied to a gated, directional coupler 504 associated with the probe 106 of FIG. 1A. During an initial pulse, a high sensitivity receiver 505 associated with the signal processor 121 is disabled, and the pulse is applied to the conductive pipe 102.

The processor 121 controls the gated, directional coupler 504 to gate the receiver 505 on and thereby detect a return from the resonant network device 110 located in the resonant cavity. This return is generally depicted as the ringing frequency 508.

The ability of the receiver 505 to detect a reflected signal from the resonant network device 110 when the exemplary impulse 502 is transmitted by the above-surface signal generator 105, can be affected by the depth of the probe in the borehole (e.g., greater than 80 ft. or any other depth as desired) and by electronic noise generated in the borehole, both of which can result in a reduction in strength of the reflected signal.

To reduce these effects, the time domain tracking method technique establishes a specific time of pulse transmission and pulse return which allows precise control of the receiver gate sequence. A timing and delay system 510 can set a delay preset (e.g., 8150 nano-seconds as illustrated in FIG. 5) to control the gating of the receiver 505 for receipt of the feedback pulse. During the gating on of the receiver 505, the ping generated by the resonant network device 121 passes through the gated directional coupler 504 and through a band pass filter unit 512. A filtered signal from the band pass filter unit 512 is supplied to an analog-to-digital signal recorder 514 and into a master control unit (e.g., microprocessor, such as a Pentium, or other suitable microprocessor) of the processor 121. One skilled in the art will appreciate that any of the functionality illustrated in FIG. 5 can be implemented in hardware, software, firmware, or any suitable combination.

A telemetry/communication link system 516 can be provided to transmit information obtained from the borehole to any desired location. The telemetry/communication link system can be any suitable transmission and/or receiving system including, but not limited to, wireless and/or wired systems.

Figure 6A:
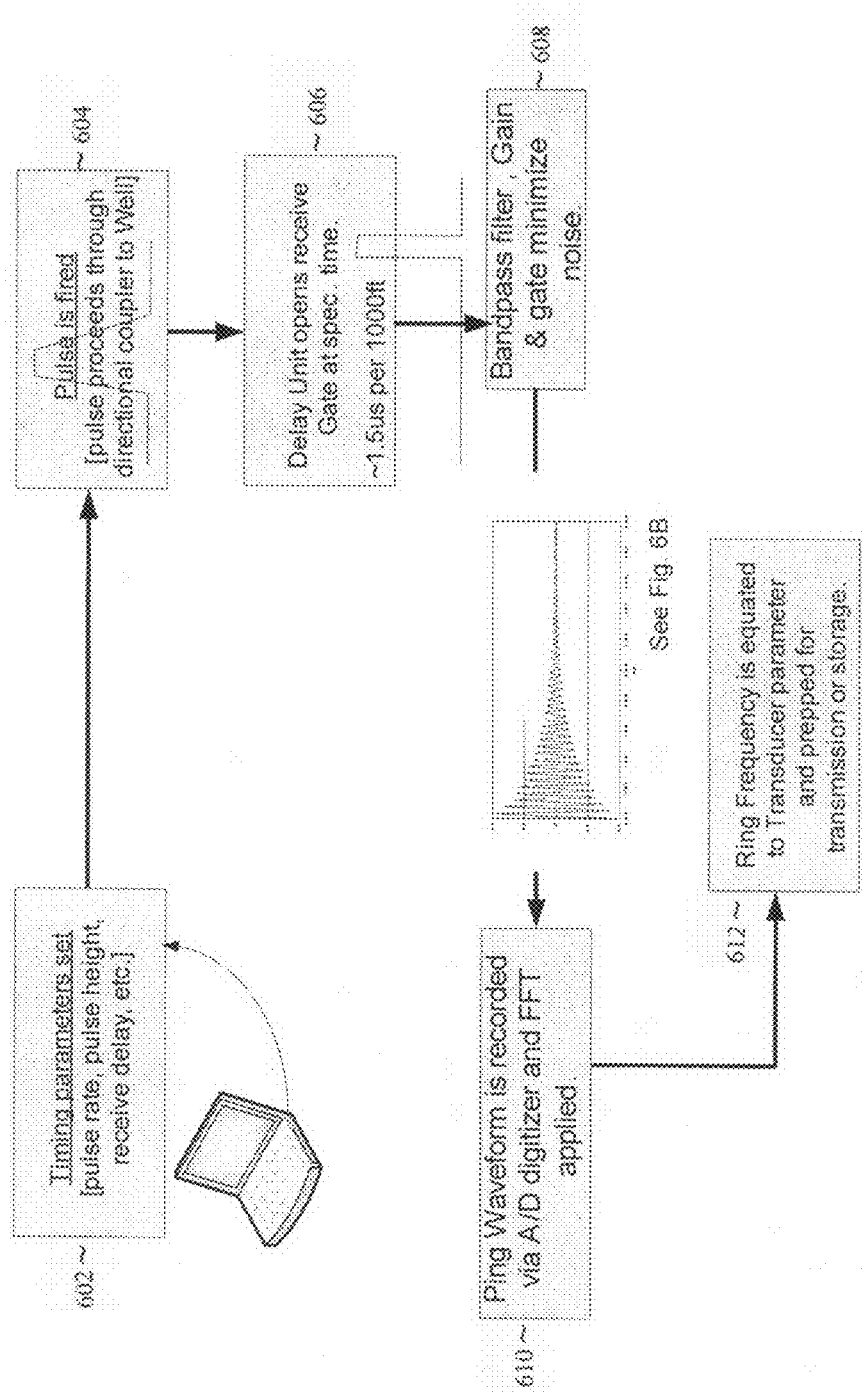
FIG. 6A shows an exemplary method for sensing a characteristic of a borehole using a time domain tracking method.

FIG. 6A shows an exemplary method for sensing a characteristic of a borehole using the time domain tracking method and, for example, an apparatus as described with respect to FIG. 5.

In FIG. 6A, at block 602, an operator can set timing parameters (e.g., via the general user interface). These parameters can include, without limitation, a pulse rate, a pulse height, a received delay, and so forth. In block 604, a pulse is supplied (e.g., fired) to the conductive pipe 102 via the directional coupler.

When detecting a reflective signal, after a specified delay, the timing and delay system 510 (see FIG. 5) opens a receiving gate to detect the modulated vibration frequency from the resonant network device 110 (Block 606). This modulated vibration frequency constitutes a ring which enters the band pass filter, and which is recorded by the analog-to-digital (A/D) converter 512 (Block 608).

In block 610, a digitized signature of the ringing signal can be processed for frequency, using, for example, a fast fourier transform (FFT). In block 612, the ring frequency can be equated, through software such as look-up tables contained within the processor 121, to a particular characteristic or LC filter parameter of the resonant network device 110, and then prepared for transmission or storage.

Figure 6B:
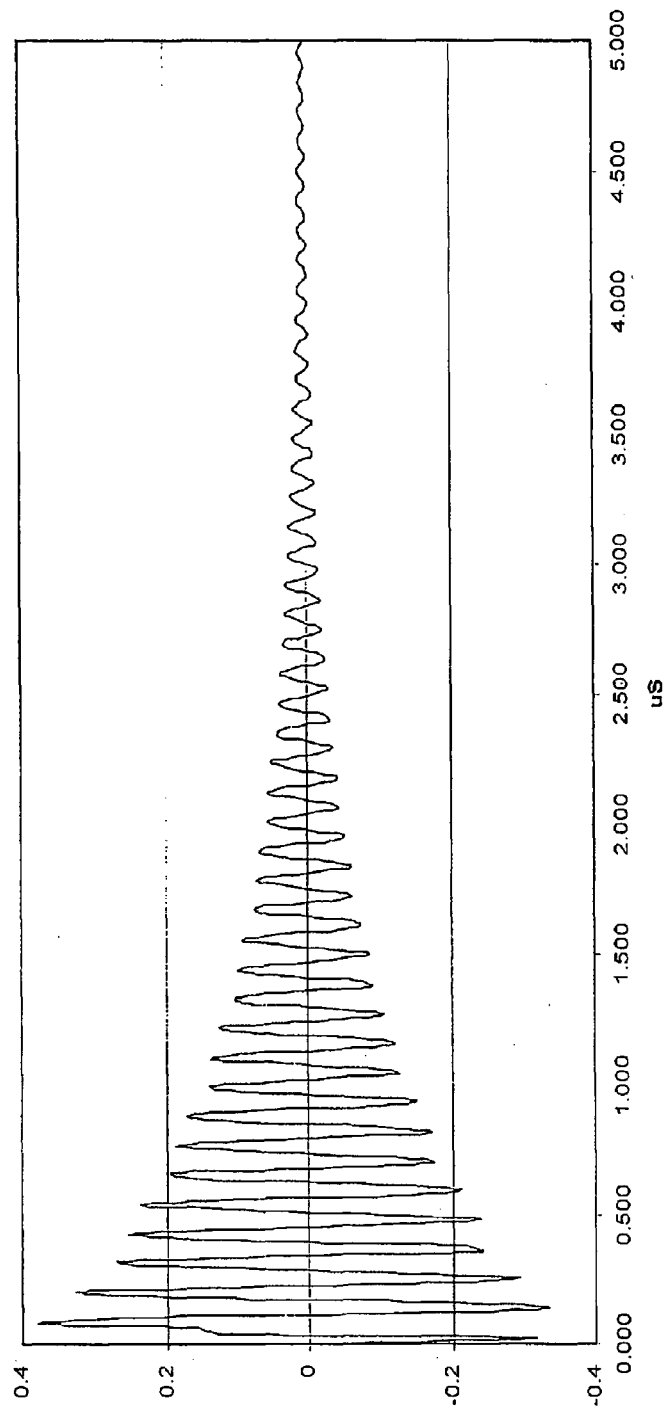
FIG. 6B shows an exemplary plot of a signal detected using the time domain tracking method.

FIG. 6B shows an exemplary plot of the detected reflective signal under the time domain tracking method.

Figure 7:
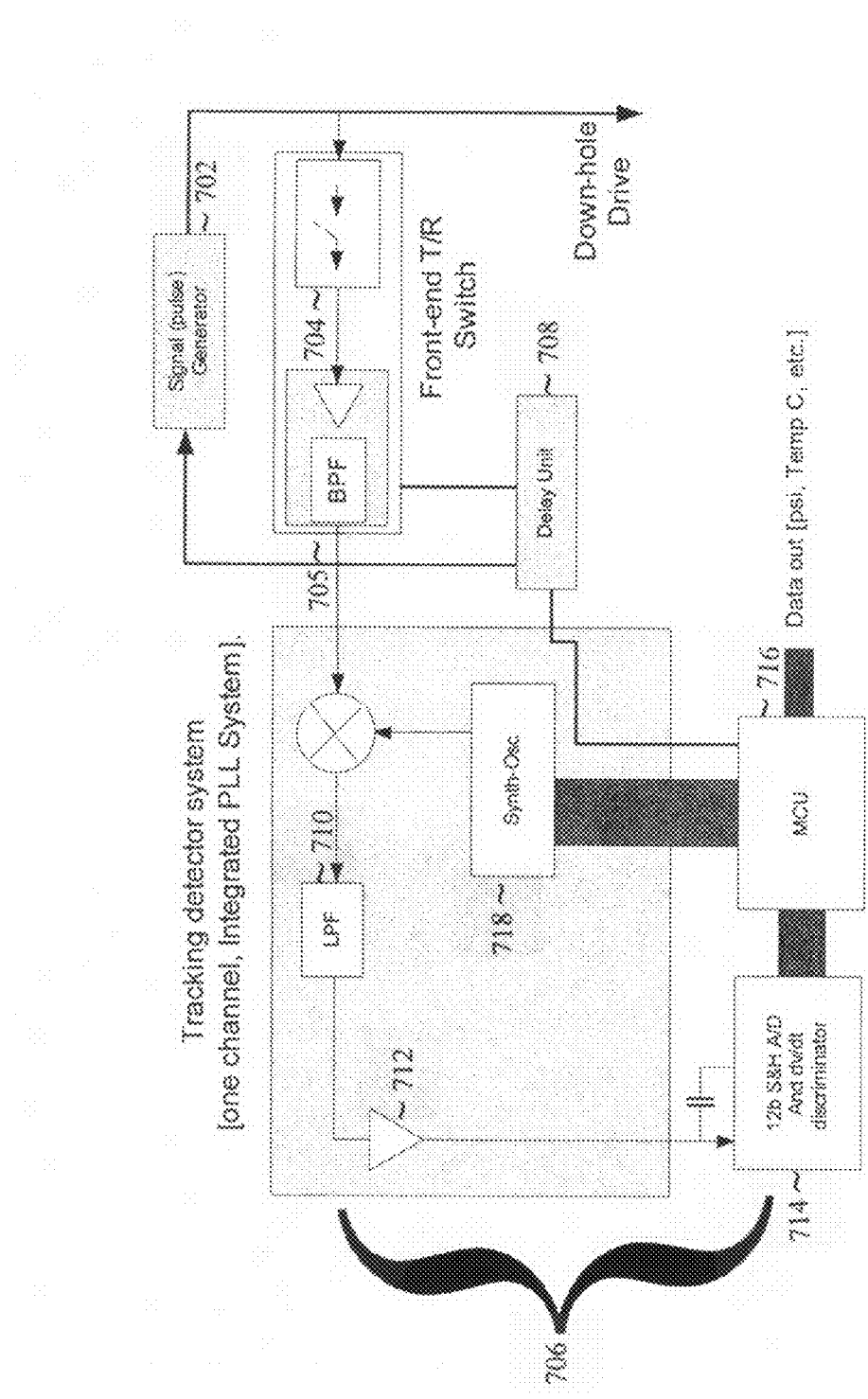
FIG. 7 shows an exemplary system for interrogating a downhole environment through a frequency domain tracking method.

FIG. 7 illustrates an exemplary system for interrogating a downhole environment through a frequency domain tracking method.

In FIG. 7, pulse generating means 702, such as signal generator 105 (FIG. 1A), generates an exemplary electromagnetic (EM) pulse. A gated directional coupler 704 is connected to receive the pulse, and during a transmit cycle, disable the receiver 706 so that the pulse can be applied to the conductive pipe 102. Non-nuclear means for generating EM pulses are well-known to those in the nuclear-weapons community. Such EM pulse generators are typically used to test electronic devices by simulating EM pulses associated with nuclear blasts. See, e.g., U.S. Pat. Nos. 3,562,741 (McEvoy et al.); 4,430,577 (Bouquet); 4,845,378 (Garbe et al.); and 5,150,067 (McMillan).

The processor 121 controls the gated directional coupler 704 to gate the receiver 706 on and thereby detect a return from the resonant network device 110 located in the resonant cavity.

When using the above-surface technique, for example, a delay unit 908 can be configured (e.g., programmed) to a preset delay to control the gating of the receiver 706 for receipt of the feedback pulse. During the gating of the receiver 706, the ping generated by the resonant network device 110 passes through the gated directional coupler 704 and through a band pass filter 905. The receiver 706 is connected to receive the filtered signal. The receiver 706 can include a phase lock loop (PLL) and feedback circuit (PLL circuit) 708 to lock onto the desired frequency.

The PLL circuit 708 can be implemented through a low pass filter 710 that receives signal from the band pass filter 705. Amplifiers 712 can be connected to receive the filtered output of the low pass filter 710 and provide the amplified signal on its output to an analog-to-digital (A/D) converter 714. The output of the A/D converter 714 is received by a feedback control means 716, such as a proportional-integral-derivative (PID) controller or other programmable logic device, as desired. The feedback controller 710 can be configured to calculate a difference between the detected frequency and the desired frequency to determine when the detected frequency is within a desired tolerance. When the detected frequency is within the desired tolerance the feedback controller 716 provides an appropriate output signal to an oscillator 718 so that the PLL circuit 708 can lock onto the detected frequency of the pulse.

Once the PLL circuit 708 locks onto the frequency of the pulse, the processor uses the frequency value as an address in a look-up table to obtain a corresponding temperature value, a pressure value, or other value representing a measurable characteristic of the downhole environment.

Figure 8A:
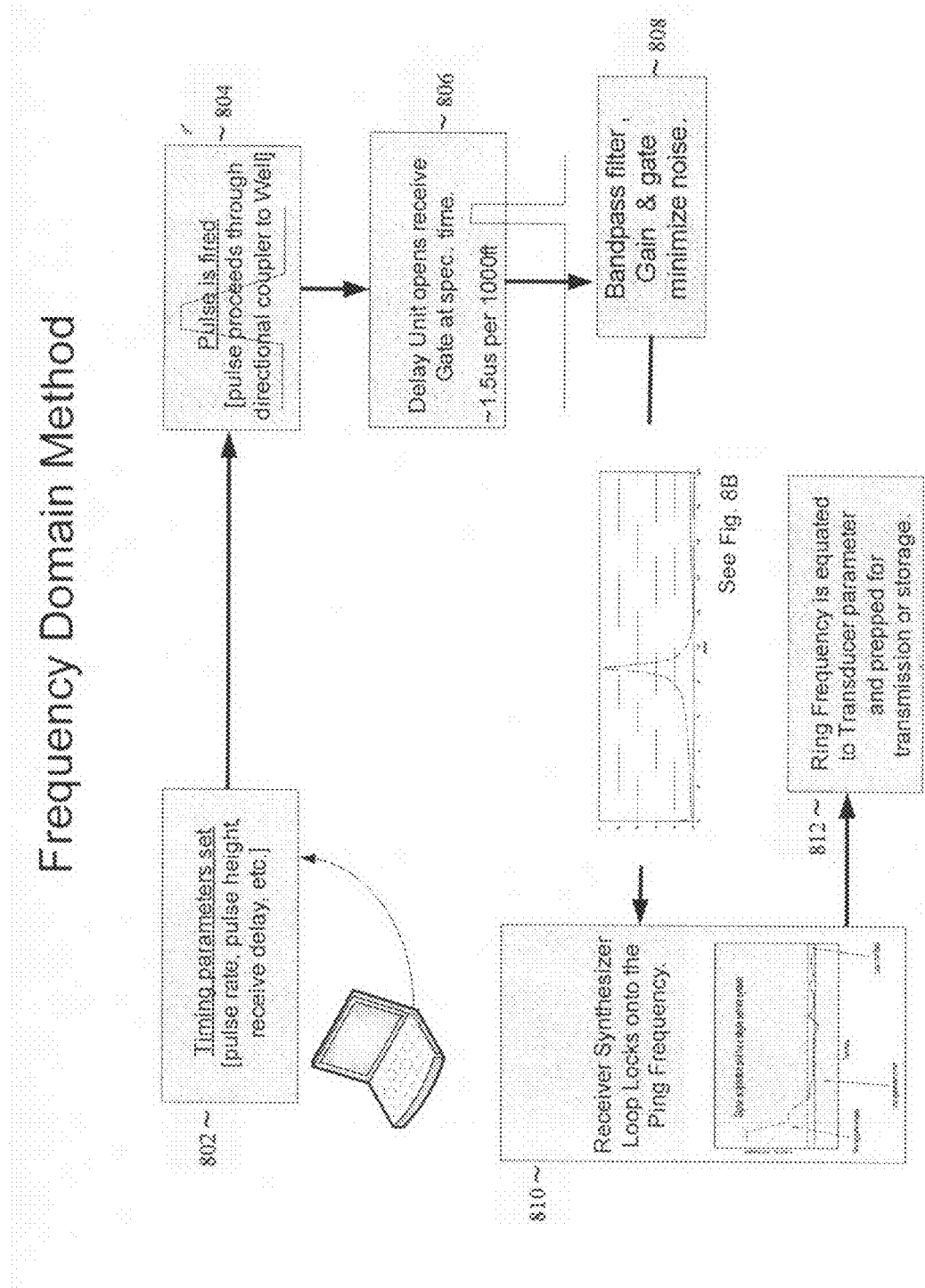
FIG. 8A shows an exemplary method for sensing a characteristic of a borehole through a frequency domain tracking method.

FIG. 8A shows an exemplary method for sensing a characteristic of a borehole using a frequency domain tracking method and an apparatus as described with respect to FIG. 5. In FIG. 8A, at block 802, an operator can set timing parameters as previously discussed with respect to the time domain tracking method of FIG. 6A. A pulse section representing the signal generator 105 of FIG. 1A is provided to transmit an exemplary impulse. This pulse is supplied to a gated directional coupler 804 associated with the probe 106 of FIG. 1A. During an initial pulse, a high sensitivity receiver 505 associated with the signal processor 121 is disabled, and the pulse is applied to the conductive pipe 102. The processor 121 controls the timing of the gated, directional coupler 504 to gate the receiver 505 or when the exemplary impulse is generated by the above-ground signal generator 105.

At block 806, when detecting a reflective signal, a receiving gate is opened to detect the modulated vibration frequency from the resonant network device 110. The receiver filters and amplifies the filtered signal to minimize noise (block 808). The receiver uses a phase lock loop (PLL) and feedback circuit 906 to lock onto the desired frequency (block 810). The PLL circuit 906 enables the processor 121 to lock onto the ringing frequency of the ring pulses generated by the resonant network device 110. The feedback circuit enables the processor 121 to adjust its frequency setting when a pulse is detected, and maintain the set or locked frequency when a pulse is not detected.

When the detected frequency is within a desired tolerance, the frequency is locked and used as an address to a numerical value in a look-up table (LUT) (block 812). The numerical value represents a measured temperature, pressure, or other measurable characteristic of the borehole.

The processor 121 uses a detection window that observes 10 to 20 cycles over time. The number of cycles necessary to accurately lock onto a frequency is dependent on the signal-to-noise (S/N) ratio of the detected pulse. The number of cycles is indirectly proportional to the S/N ratio. The pulses are received at a rate of 10 MHz to 100 MHz or lesser or greater as desired. The processor 121 demodulates the received pulses to realize a 12-bit word, which consists of 10 bits of data (2 bits of overhead).

Figure 8B:
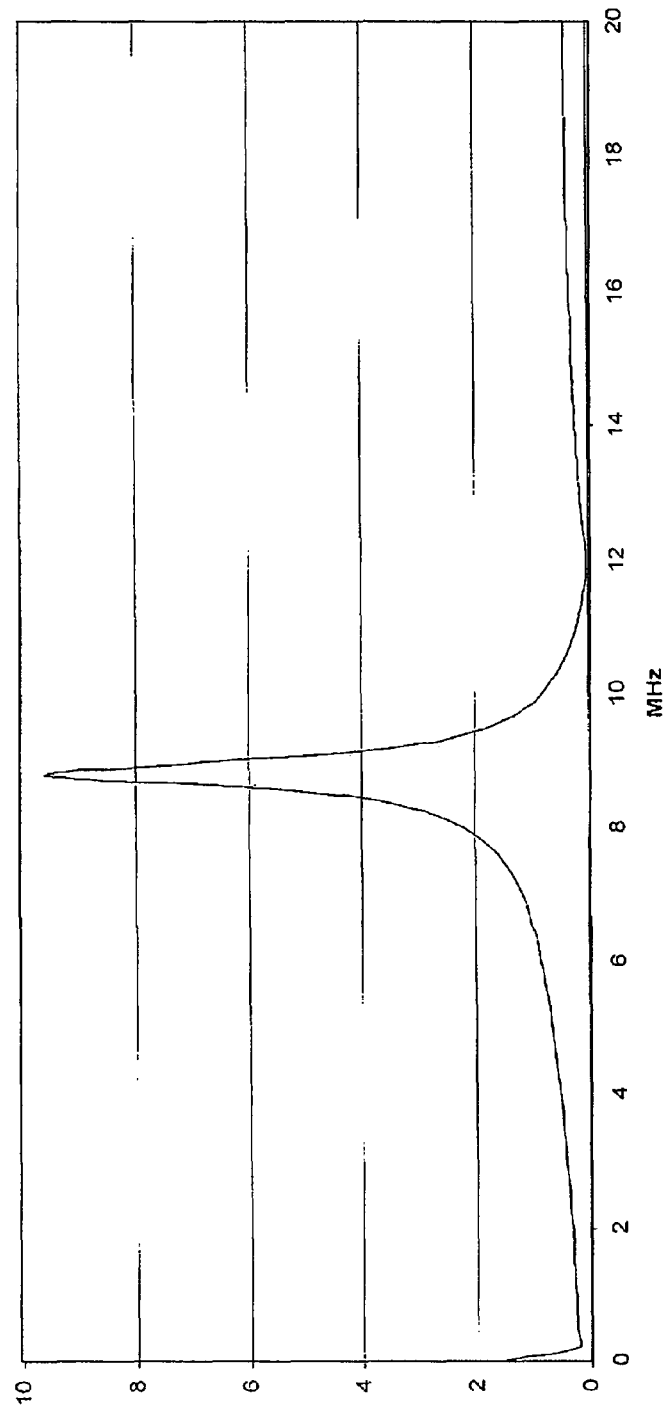
FIG. 8B shows an exemplary plot of a signal detected using the frequency domain tracking method.

FIG. 8B shows an exemplary plot of a detected reflective signal under the frequency domain tracking method.

Numerous additional variations on the above-described embodiments exist. A few such variations are described below.

In some embodiments, the signal can be digitized. Digitation allows processing of the signal using algorithms that can enhance the signal-to-noise (S/N) ratio and can provide a way to single out desired signals from the spurious reflections that can occur from non-sensors.

In some embodiments, a directional wave coupler can be employed to prevent reflections of the signal as it is transmitted between the surface and the downhole sensors. It can happen that undesirable reflections can result from impedance mismatches at connects between cables and devices in the system. Directional wave couplers can minimize such spurious reflections. Such devices are known in the art and are available from electronics supply companies such as Meca Electronics, Inc., Denville, N.J.

In some embodiments, a surface-to-surface relay of the transmitted signal, as it is received at the surface of the well, is performed. e.g., as described in U.S. Pat. No. 6,434,372 to Neagley et al.

In some embodiments, downhole devices (e.g., valves) can be selectively actuated using the electromagnetic energy transmitted from the surface. The energy can be transmitted from the surface in the form of a pulse or in a continuous wave format or other electromagnetic form. The energy is stored over time in a capacitor bank downhole and released when actuation of the valve or other device is called for. Selective discharge of the capacitor bank, and hence, actuation, can be effected with a separate resonant network device designed to ring at a distinct frequency.

Those skilled in the art will appreciate that the disclosed embodiments described herein are by way of example only, and that numerous variations will exist. The invention is limited only by the claims, which encompass the embodiments described herein as well as variants apparent to those skilled in the art.

What we claim is:

1. A method for interrogating a downhole environment below a surface of a landform, the method comprising the steps of:
    directing at least one electromagnetic energy pulse into a downhole environment such that the electromagnetic energy pulse interacts with at least one downhole transducer such that at least some of the electromagnetic energy contained within the pulse is reflected at a ring frequency determined by the at least one downhole transducer;
    receiving the reflected energy pulse at a receiver located at the surface of the landform during a predetermined time interval;
    processing the received energy pulse to extract the ring frequency using a processing method selected from the group consisting of time domain tracking, frequency domain tracking, and combinations thereof; and
    correlating the ring frequency to a parameter of the transducer, wherein said parameter further correlates to a condition in the downhole environment.

2. The method of claim 1, wherein the processing is carried out using time domain tracking, and wherein the predetermined time interval is synchronized based on a depth-determined delay of the reflected energy pulse.

3. The method of claim 2, further comprising recording the ring frequency of the reflected energy pulse.

4. The method of claim 2, wherein the receiving step comprises controlling a gating of the receiver based on a delay preset.

5. The method of claim 2, wherein the receiving step comprises excluding low power signals that are equal or nearly equal to the ring frequency.

6. The method of claim 2, wherein the reflected energy pulses are generated at a frequency within a range of 10 MHz to 100 KHz.

7. The method of claim 1, wherein the processing step is carried out using frequency domain tracking, and wherein the receiving step involves locking onto the ring frequency of the reflected energy pulse.

8. The method of claim 7, wherein the reflected energy pulses are generated at a frequency within a range of 10 MHz to 100 KHz.

9. The method of claim 7, wherein the receiving step comprises controlling a gating of the receiver based on a depth determined delay of the reflected energy pulse.

10. The method of claim 7, wherein the locking step comprises comparing the ring frequency of the reflected energy pulse with a desired frequency.

11. The method of claim 10, wherein the ring frequency is locked when a result of the correlating is within a tolerance range.

12. The method of claim 7, wherein the receiver maintains the locked ring frequency when outside of the predetermined time interval.

13. The method of claim 7, wherein the receiving step comprises synchronizing the predetermined time interval with a depth determined delay of the reflected energy pulse.

14. The method of claim 7, wherein the correlating comprises addressing a look-up table based on a value of the locked ring frequency.

15. The method of claim 1, wherein the at least one downhole transducer comprises at least one inductive component and at least one capacitive component.

16. The method of claim 15, wherein the ring frequency of the at least one transducer is modulated by environmentally-induced changes to the capacitive component of said transducer.

17. The method of claim 1, wherein the step of processing the received energy pulse comprises a sub-step of digitizing information contained within the received energy pulse using algorithms that can enhance signal-to-noise.

18. The method of claim 1, further comprising a step of relaying information contained within the received energy pulse, as a signal, to a remote surface receiver.

19. A system for interrogating a downhole environment, which is located below a surface of a landform, based on at least one energy pulse that is reflected at a modulation frequency from at least one downhole transducer to the surface of the landform, the system comprising:
    a means for receiving the modulated energy pulse at the surface during a predetermined time interval;
    a means for processing the received energy pulse to extract the modulation frequency; and
    a means for correlating the modulation frequency of the energy pulse to a parameter of the transducer or a characteristic of the downhole environment.

20. The system of claim 19, wherein the at least one downhole transducer comprises at least one inductive and capacitive resonant structure.

21. The system of claim 20, wherein the at least one inductive structure isolates production tubing from casing in the downhole environment.

22. The system of claim 19, further comprising a means for controlling a gating of the receiving means based on a depth determined delay of the reflected energy pulse.

23. The system of claim 22, wherein the receiving means comprises a means for locking onto the modulation frequency of the energy pulse when the modulation frequency is within a threshold.

24. The system of claim 23, wherein the means for locking locks on the modulation frequency when a result produced by the comparing means is within a tolerance range.

25. The system of claim 22, wherein the processing means is configured to exclude low power signals that are equal or nearly equal to the modulation frequency.

26. The system of claim 25, comprising a means for comparing the modulation frequency with a desired modulation frequency.

27. The system of claim 19, said system comprising two or more downhole transducers having different resonant ring frequencies.

28. The system of claim 19, further comprising a means for actuating a device downhole, wherein said actuation is effected by an electromagnetic energy pulse that rings a transducer coupled to said device.

29. The system of claim 19, further comprising a directional wave coupler to minimize spurious signal reflections.

30. An apparatus for interrogating a downhole environment located below a surface of a landform, the apparatus being included in a system that transmits energy pulses to
    at least one downhole transducer which modulates the energy pulses and returns the modulated energy pulses to a location at the surface of the landform, the apparatus comprising:
    a means for receiving the modulated energy pulses at the surface;
    a means for sampling the modulated energy pulses;
    a means for detecting a modulating frequency of the sampled energy pulses; and
    a means for correlating the modulating frequency to conditions of the downhole environment.

31. An apparatus for interrogating a downhole environment located below a surface of a landform, the apparatus being included in a system that transmits energy pulses to at least one downhole transducer which modulates the energy pulses and returns the modulated energy pulses to a location at the surface of the landform, the apparatus comprising:
    a means for receiving the modulated energy pulses at the surface;
    a means for locking onto a modulating frequency of the energy pulses when the modulating frequency is within a tolerance range; and
    a means for correlating the modulating frequency to conditions of the downhole environment.

* * * * *